(12) United States Patent
Tang-Jespersen et al.

(10) Patent No.: US 10,261,287 B2
(45) Date of Patent: Apr. 16, 2019

(54) IMAGING DEVICES HAVING AUTOFOCUS CONTROL

(71) Applicant: ams Sensors Singapore Pte. Ltd., Singapore (SG)

(72) Inventors: Christian Tang-Jespersen, Ruschlikon (CH); Michael Kiy, Winterthur (CH); Miguel Bruno Vaello Paños, Zurich (CH); Florin Cutu, San Jose, CA (US); James Patrick Long, San Jose, CA (US); Hartmut Rudmann, Jona (CH)

(73) Assignee: ams Sensors Singapore Pte. Ltd., Singapore (SG)

( * ) Notice: Subject to any disclaimer, the term of this patent is extended or adjusted under 35 U.S.C. 154(b) by 0 days.

(21) Appl. No.: 15/758,455

(22) PCT Filed: Sep. 13, 2016

(86) PCT No.: PCT/SG2016/050443
§ 371 (c)(1),
(2) Date: Mar. 8, 2018

(87) PCT Pub. No.: WO2017/044049
PCT Pub. Date: Mar. 16, 2017

(65) Prior Publication Data
US 2018/0252894 A1 Sep. 6, 2018

Related U.S. Application Data

(60) Provisional application No. 62/217,300, filed on Sep. 11, 2015.

(51) Int. Cl.
*G02B 7/28* (2006.01)
*H04N 5/225* (2006.01)
(Continued)

(52) U.S. Cl.
CPC ............... *G02B 7/28* (2013.01); *G01S 17/10* (2013.01); *G01S 17/102* (2013.01); *G01S 17/32* (2013.01);
(Continued)

(58) Field of Classification Search
CPC .......... H04N 5/23216; H04N 5/23212; H04N 5/2256; H04N 5/23293; G02B 7/28;
(Continued)

(56) References Cited

U.S. PATENT DOCUMENTS 6,301,440 B1   10/2001   Bolle et al.
8,472,798 B2 *  6/2013   Molin .............. H04N 5/23212
                                                   396/123
(Continued)

OTHER PUBLICATIONS

ISA/AU, International Search Report for PCT/SG2016/050443 (dated Nov. 3, 2016).
(Continued)

*Primary Examiner* — Luong T Nguyen
(74) *Attorney, Agent, or Firm* — Fish & Richardson P.C.

(57) ABSTRACT

The present disclosure describes imaging techniques and devices having improved autofocus capabilities. The imaging techniques can include actively illuminating a scene and determining distances over the entire scene and so that a respective distance to each object or point in the scene can be determined. Thus, distances to all objects in a scene (within a particular range) at any given instant can be stored. A preview of the image can be displayed so as to allow a user to select a region of the scene of interest. In response to the user's selection, the imager's optical assembly can be adjusted automatically, for example, to a position that corresponds to optimal image capture of objects at the particular distance of the selected region of the scene.

16 Claims, 5 Drawing Sheets

(51) Int. Cl.
  *G03B 13/36* (2006.01)
  *G01S 17/10* (2006.01)
  *H04N 5/232* (2006.01)
  *G02B 7/32* (2006.01)
  *G02B 7/40* (2006.01)
  *G03B 13/20* (2006.01)
  *G01S 17/32* (2006.01)

(52) U.S. Cl.
  CPC ............... *G02B 7/32* (2013.01); *G02B 7/40* (2013.01); *G03B 13/20* (2013.01); *G03B 13/36* (2013.01); *H04N 5/2256* (2013.01); *H04N 5/23212* (2013.01); *H04N 5/23216* (2013.01); *H04N 5/23293* (2013.01)

(58) Field of Classification Search
  CPC . G02B 7/32; G02B 7/40; G03B 13/36; G03B 13/20; G01S 17/102; G01S 17/10; G01S 17/32
  See application file for complete search history.

(56) References Cited

U.S. PATENT DOCUMENTS

| | | |
|---|---|---|
| 2008/0131019 A1 | 6/2008 | Ng |
| 2012/0120277 A1 | 5/2012 | Tsai |
| 2013/0120565 A1* | 5/2013 | Wilks ............... G01S 7/497 348/135 |
| 2015/0002664 A1* | 1/2015 | Eppinger ............... G06T 7/004 348/142 |
| 2015/0288870 A1* | 10/2015 | Nagaraja ............... H04N 5/2356 348/333.02 |
| 2016/0037052 A1* | 2/2016 | Brunner ............... H04N 5/23212 348/353 |

OTHER PUBLICATIONS

"Time-of-flight camera," https://en.wikipedia.org/wiki/Time-of-flight_camera.
"Which Smartphone Has the Best Autofocus; How Does It Work?," http://www.makeuseof.com/tag/which-smartphone-has-the-best-autofocus-how-does-it-work/, (Sep. 4, 2015).

* cited by examiner

IMAGING DEVICES HAVING AUTOFOCUS CONTROL

FIELD OF THE DISCLOSURE

The present disclosure relates to imaging devices having autofocus control.

BACKGROUND

Some image acquisition devices, such as digital cameras and smartphone cameras, include an autofocus ("AF") optical system operable to focus on a selected point or area of a scene. The AF feature can provide the device with the ability to focus automatically on a subject correctly, without the need for manual intervention from the user.

Various types of AF control are available, including passive control (e.g., contrast AF), and active control (e.g., Laser AF). Smartphones, for example, tend to use passive AF, because contrast is needed for the lens to focus. Such devices may have difficulty focusing on blank colored surfaces or in low light. A flash, which is included on some smartphones, can help produce artificial light to aid in the focusing in these situations. Contrast AF tends to be highly iterative and thus can be time-consuming and can use significant computational resources. Active AF, on the other hand, involves actively measuring the distance to an object in a scene, and then adjusting the optics for proper focus of that particular object. Active AF often works well in a low-light environment, but only a limited area typically is illuminated by the active illumination. Consequently, distance information of a limited area in a scene is known. If a user desires another area in the scene to be in focus, the camera or host device must retake the distance measurement.

SUMMARY

The present disclosure describes imaging techniques and devices having improved autofocus capabilities. The imaging techniques can include actively illuminating a scene and determining distances over the entire scene and so that a respective distance to each object or point in the scene can be determined. Thus, distances to all objects in a scene (within a particular range) at any given instant can be stored. A preview of the image can be displayed so as to allow a user to select a region of the scene of interest. In response to the user's selection, the imager's optical assembly can be adjusted automatically, for example, to a position that corresponds to optimal image capture of objects at the particular distance of the selected region of the scene.

In one aspect, for example, a method of generating an image includes displaying a first image on a display screen, wherein each of multiple regions of the displayed image has associated therewith a respective distance value. The method includes receiving input indicative of a user-selection of one of the regions of the displayed image. In response to receiving the user input, a position of an optical assembly of an imager is adjusted so that the imager is focused on one or more objects at a distance that corresponds to the distance value associated with the user-selected region of the displayed image.

One or more of the following features are present in some implementations. For example, the method can include including acquiring, by the imager, a second image while the one or more objects at the distance that corresponds to the distance associated with the user-selected region of the displayed image are in focus for the imager.

In some cases, the method includes calculating the respective distance value for each of the regions of the displayed first image based on an optical time-of-flight technique. Further, the method can include emitting modulated or pulsed optical radiation signals toward the scene, sensing, by a time-of-flight receiver, signals of the modulated or pulsed optical radiation reflected by one or more objects in the scene, generating output signals based on the sensed signals, calculating the respective distance value for each of the regions of the first image based, at least in part, on the output signals.

In some instances, receiving input indicative of a user-selection includes receiving a signal indicative of a user touching an area of the display screen where the selected region of the image appears. In some implementations, adjusting the position of the optical assembly is based, at least in part, on an adjustment amount stored in a look-up table in memory, wherein the adjustment amount corresponds to the distance associated with the user-selected region of the displayed image.

In another aspect, the disclosure describes an apparatus that includes a host device comprising a display screen and operable to receive user input. The apparatus also includes an imaging device comprising an imager and a time-of-flight module. The imager is operable to acquire an image of a scene and includes an adjustable optical assembly operable for autofocus. The time-of-flight module includes an illumination source to emit modulated or pulsed optical radiation, and a receiver operable to sense modulated or pulsed optical radiation reflected by one or more objects in the scene at a wavelength emitted by the illumination source and, in response to sensing the optical radiation, to generate output signals. One or more processors are collectively operable to cause a first image acquired by the imager to be displayed on the display screen, calculate a respective distance value for each of multiple regions of the displayed image based, at least in part, on the output signals, and in response to input indicative of a user-selection of one of the regions of the displayed image, adjust a position of the optical assembly so that one or more objects, at a distance that corresponds to the distance value associated with the user-selected region of the displayed image, are in focus for the imager.

In some implementations, the one or more processors are collectively operable to calculate the respective distance value for each of the multiple regions of the displayed image using a time-of-flight technique. Further, in some instances, the display screen is an interactive touch screen operable to receive an indication of the region of the displayed image selected by the user for autofocus in response to the user touching the display screen.

In accordance with another aspect, a method of generating an image includes displaying a first image on a display screen, wherein each of multiple regions of the displayed image has associated therewith a respective distance value. The method includes receiving input indicative of a user-selection of one of the regions of the displayed image, the selected region of the image including an object. A future position of an object is estimated based, at least in part, on a distance that corresponds to the distance value associated with the user-selected region of the displayed image, and an optical assembly of an imager is adjusted, so that object is in focus when the object is at the future position.

In some cases, the foregoing method also includes acquiring, by the imager, a second image when the object is at the future position. In some cases, the respective distance value for each of the regions of the displayed first image is calculated based on an optical time-of-flight technique. For example, some implementations include emitting modulated or pulsed optical radiation signals toward the scene, sensing, by a time-of-flight receiver, signals of the modulated or pulsed optical radiation reflected by one or more objects in the scene, generating output signals based on the sensed signals, and calculating the respective distance value for each of the regions of the first image based, at least in part, on the output signals. In some instances, receiving input indicative of a user-selection includes receiving a signal indicative of a user touching an area of the display screen where the object in the image appears.

In yet another aspect, an apparatus includes a host device comprising a display screen and operable to receive user input. The apparatus also includes an imaging device comprising an imager and a time-of-flight module. The imager is operable to acquire an image of a scene and includes an adjustable optical assembly operable for autofocus. The time-of-flight module included includes an illumination source to emit modulated or pulsed optical radiation, and a receiver operable to sense modulated or pulsed optical radiation reflected by one or more objects in the scene at a wavelength emitted by the illumination source and to generate output signals based on the sensed signals. One or more processors collectively are operable to cause a first image acquired by the imager to be displayed on the display screen, and calculate a respective distance value for each of multiple regions of the displayed image based, at least in part, on the output signals. In response to input indicative of a user-selection of one of the regions of the displayed image, where the selected region of the image includes an object, the one or more processors estimate a future position of the object based, at least in part, on a distance that corresponds to the distance value associated with the user-selected region of the displayed image. The one or more processor adjust the optical assembly so that the object is in focus for the imager when the object is at the future position.

In some implementations, the one or more processors are collectively operable to calculate the respective distance value for each of the multiple regions of the displayed image using a time-of-flight technique. The display screen can be, for example, an interactive touch screen operable to receive an indication of the region of the displayed image selected by the user for autofocus in response to the user touching the display screen.

Other aspects, features and advantages will be readily apparent from the following detailed description, the accompanying drawings, and the claims.

DETAILED DESCRIPTION

The present disclosure describes imaging techniques and devices having improved autofocus capabilities. The imaging techniques include actively illuminating a scene and determining distances over the entire scene and so that a respective distance to each object or point in the scene can be determined. Thus, distances to all objects in a scene (within a particular range) at any given instant can be stored. A preview of the image can be displayed so as to allow a user to select a region of the scene of interest. In response to the user's selection, the imager's optical assembly can be adjusted automatically, for example, to a position that corresponds to optimal image capture of objects at the particular distance of the selected region of the scene.

Figure 1:
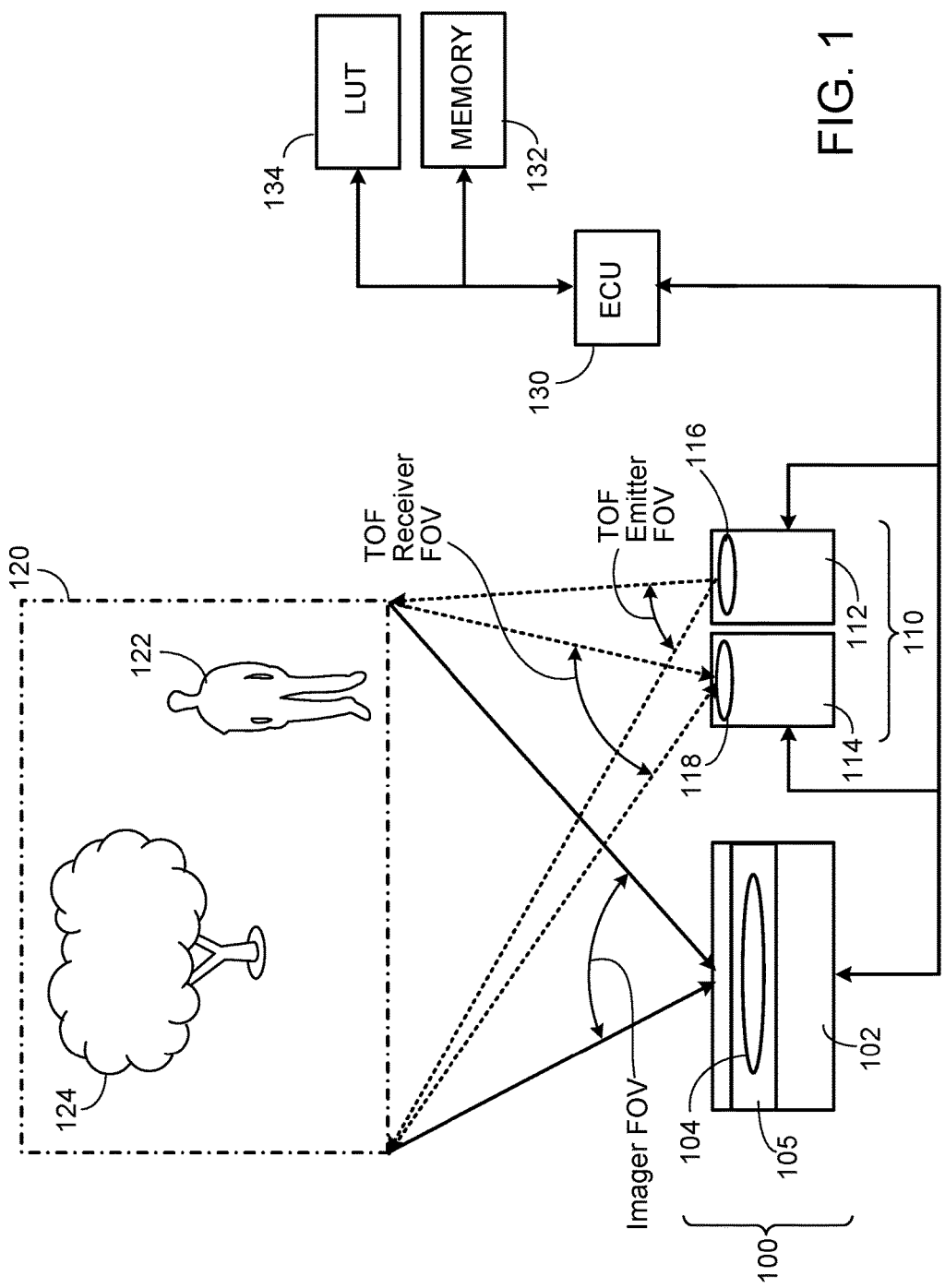
FIG. 1 illustrates an example of an imaging device.

As shown in FIG. 1, an imaging device 100 includes a primary imager 102 having an optical assembly 104 that includes one or more lenses whose positions can be adjusted (e.g., by an actuator such as a motor or MEMs actuator) to achieve autofocus. Imager 102 is operable to acquire images of a scene 120 that includes one or more objects 122, 124. The imager 102 may have a relatively large number of pixels (e.g., an array of 30×40 pixels) so as to be capable of acquiring relatively high resolution images. In some instances, the imager 102 is implemented using CCD or CMOS sensor technology.

The imaging device 100 also includes a time-of-flight ("TOF") module 110, which has an illumination source 112 and an optical receiver 114 operable to detect a wavelength (or range of wavelengths) of radiation emitted by the illumination source 112. Thus, in some instances, the illumination source 112 is operable to emit pulsed or other modulated electro-magnetic radiation. For example, some implementations use a direct TOF technique in which single pulses of radiation are emitted by the illumination source 112, and the receiver 114 detects the rising and falling edges of the pulses and provides time stamps for the detected edges. In such implementations, the time-of-flight can be determined by measuring the time between the emission of a light pulse and its arrival after reflection by an object in the scene.

Other implementations can use a phase shift, or indirect, TOF technique. For example, the illumination source 112 can be operable to emit modulated infra-red ("IR") radiation, and the receiver 114 can include an array of TOF demodulation pixels operable to detect IR radiation reflected by the objects 122, 124 and to demodulate the detected signals. In operation, modulated light emitted by the illumination source 112 through optics assembly 116 is directed toward the scene 120. A fraction of the total optical power directed to the scene 120 is reflected back to the TOF module 110, through optics assembly 118, and is detected by demodulation pixels in the receiver 114. Each pixel in the receiver 114 is operable to demodulate the impinging light signal that is collected by the optics assembly 118 (e.g., a lens). The demodulation values allow for each pixel to compute the time-of-flight, which, in turn, directly corresponds to the distance information (R) of the corresponding point in the scene 120. The time-of-flight can be obtained by demodulating the light signals reflected from the scene 120 and that impinge on the active pixels of the receiver 114. Various known modulation techniques can be used, such as pseudo-noise modulation, pulse modulation or continuous modulation. The distance to the object for each pixel then can be calculated based on the detected signals using known techniques. The distance information for each pixel (or average values for respective sub-groups of the pixels) can be stored, for example, in memory 132.

The illumination source 112 can be implemented, for example, as a light emitting diode (LED), infra-red (IR) LED, organic LED (OLED), infra-red (IR) laser or vertical cavity surface emitting laser (VCSEL). The receiver 114 can be implemented, for example, as an N×M array IR-sensitive pixels. If the phase shift, or indirect, TOF technique is used, then the receiver 114 can include an array of demodulation pixels. In some instances, the array is relatively small (e.g., 3×3 pixels); although different numbers of pixels can be used for some implementations (e.g., an array of 30×40 pixels).

An electronics control unit (ECU) 130, which can include control, decoder, read-out circuitry as well as processing and other logic (e.g., microprocessor and/or other circuitry), can control the timing of the illumination source 112 and receiver 114 to enable its synchronous detection. The ECU 130 can be implemented, for example, as one or more processor chips (e.g., a microprocessor) configured with hardware logic and/or software instructions to perform the tasks described here. The ECU 130, the imager 102 and the TOF module 110 can be mounted, for example, on a printed circuit board in the host device.

Preferably, the field-of-view ("FOV") of the imager 102 and the TOF module 110 substantially overlap one another.

Figure 2:
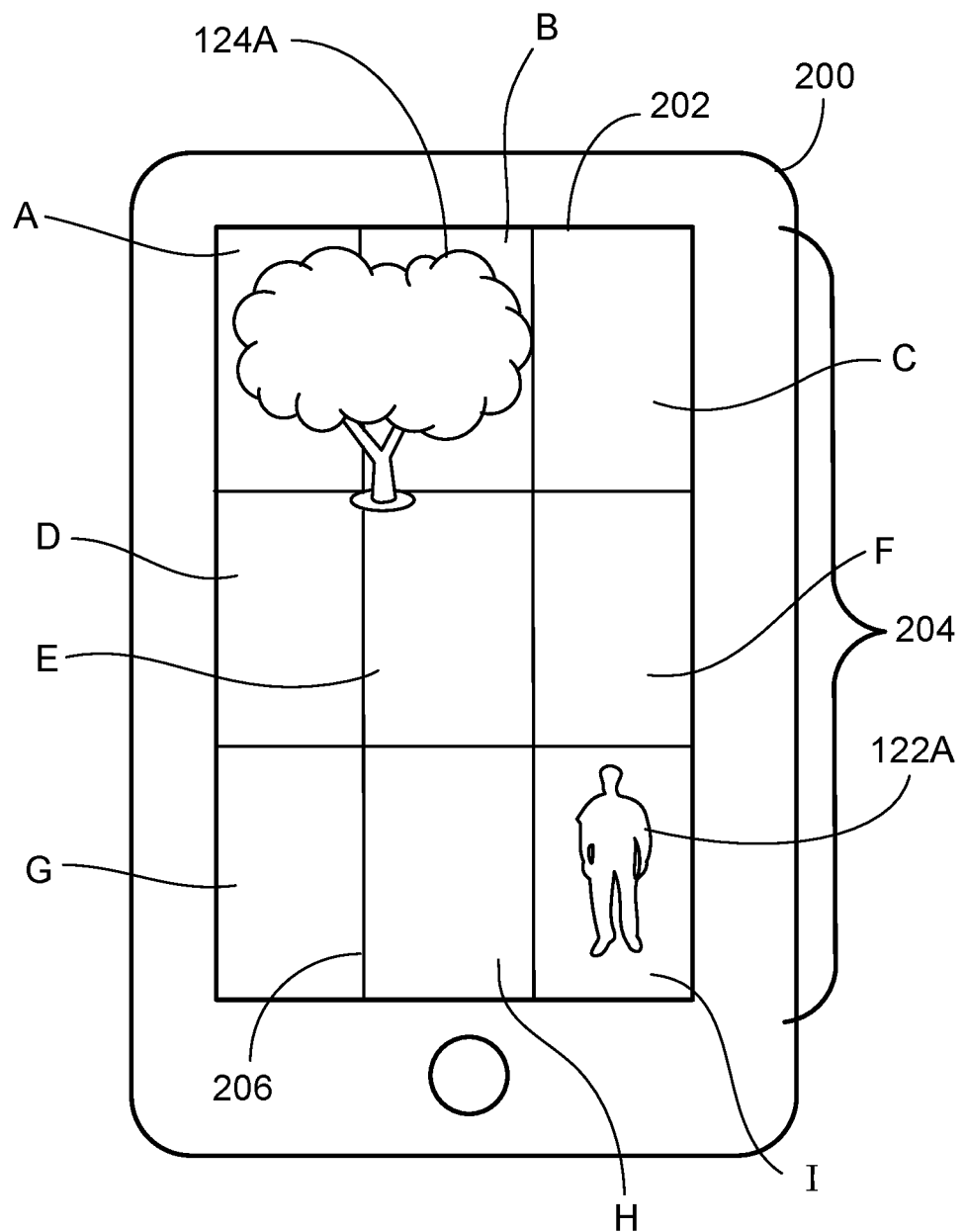
FIG. 2 illustrates an example of a host device displaying an image acquired by the imaging device.

The imager 102 and TOF module 110 can be incorporated into a host device (e.g., a smart phone, mobile phone, tablet, personal data assistant, notebook computer) with suitable power resources, and processing circuitry. A user can activate the imaging device 100 to acquire an image, for example, by pushing an appropriate button on the host device or by tapping on an appropriate icon on an interactive display screen (e.g., a touch screen) 204 of the host device 200 (FIG. 2). In response, a preview of the image 202 acquired by the primary imager 102 is displayed on the display screen 204 of the host device 200. In some instances, the preview image 202 may be relatively coarse and/or portions of the previewed image of interest to the user may be slightly out of focus. The user, however, can select a particular region of the image (or a particular object in the image) that she wants to be in-focus. The user can perform the selection, for example, by touching the area of the display screen 204 where the object or region of interest is displayed. For example, if the user wants the object 124A to be in focus, she would touch one of the areas A, B of the display screen 204 where the object 124A appears.

In the illustrated example of FIG. 2, each region of the image 202 is associated with a respective distance value based on previously calculated and stored values for the image. Assuming, for example, that the TOF receiver 114 includes an array of 3×3 pixels for a total of nine demodulation pixels, the display screen 204 can be divided into the same number (i.e., 9) regions, each of which is associated with a respective one of the pixels. Each region (A though I) of the display screen 204 is thus associated with a respective distance value based on the previously calculated and stored values for the acquired image. In some instances, a grid 206 indicating the various regions (A though I) can be overlaid on the displayed image 202. In some implementations, the image is displayed without such a grid.

In some cases, to provide for greater resolution, the receiver 114 may have a greater number of pixels (e.g., an array of 30×40). If each region of the image 202 is associated with a single pixel, then there would be a greater number of user-selectable regions of the image 202. In some instances, the pixels form non-overlapping sub-groups, each of which includes pixels that are adjacent one another. Each region of the image 202 then corresponds to a respective one of the sub-groups of pixels. In such cases, the distance value associated with a particular region can be, for example, the average distance value for all the pixels in the sub-group.

To select a particular object or area of the image 202 for autofocus, the user touches (e.g., with her finger or a stylus) the region of the display screen 204 in which the particular object or area of the previewed image appears. Thus, for example, if the user wants the imaging device 100 to capture an image in which the object 124A is in focus, she would touch region A or region B of the display screen 204 where the object 124A appears. In response, the ECU 130 generates one or more signals to adjust the position of the optics assembly 104 in the imager 102 so that objects in the scene 120 at a distance corresponding to the previously stored value for the selected region are in-focus. The autofocus mechanism 105 thus focuses the optical assembly 104 according to the distance to the part of the scene associated with the region of the display selected by the user. Distances can be correlated with, for example, pre-set focus information for the optical assembly 104. The focus information can be stored, for example, in a look-up table ("LUT") 134 in memory.

When the user again activates the imaging device 100 to capture an image, the optics assembly 104 in the imager 102 will be positioned such that objects located at a distance corresponding to the user-selected portion of the scene 120 are in focus. In some cases, the user may not need to reactivate the imaging device by pushing a button on the host device or by tapping on an icon on the interactive display screen of the host device another time. Instead, the imaging device 100 can be configured to capture the auto-focused image as soon as the optics assembly 104 is adjusted, without the need for further user input.

Figure 3:
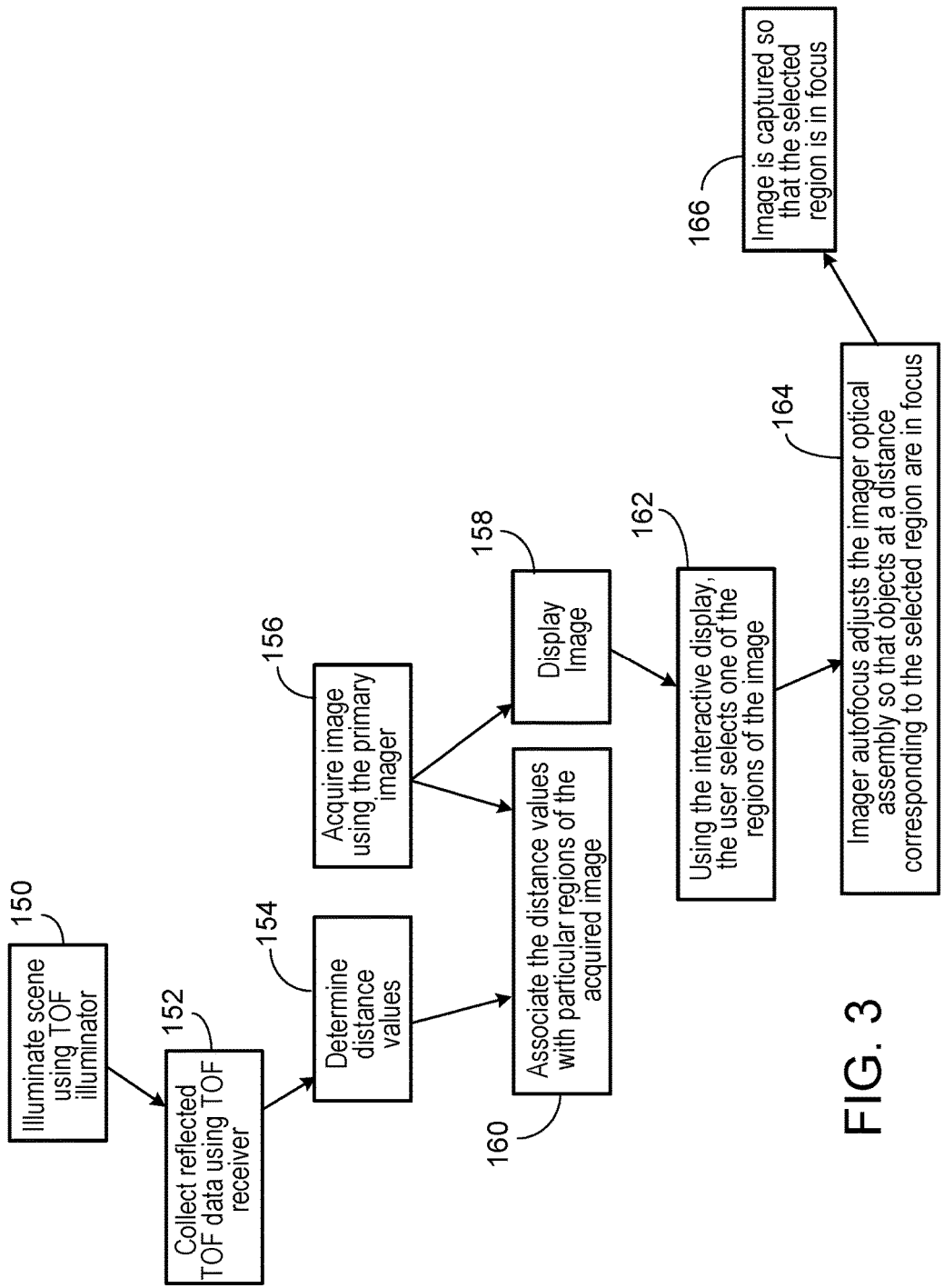
FIG. 3 is a flow chart showing an example of a method for autofocus.

FIG. 3 is a flow chart of a method according to some implementations. As indicated by 150, a scene is illuminated by the TOF illumination source 112. The TOF receiver 114 collects light (e.g., IR) reflected by one or more objects in the scene (152), and the demodulated (or other sensed) signals are used to determine distance values to multiple points in the scene (154). The primary imager 102 also acquires an image of the scene (156). The image acquired by the imager 102 is displayed on an interactive display screen of a host device (158), and each of various regions of the displayed image is associated with one of the previously-calculated distance values (160). A user then can select one of the regions of the displayed image using, for example, the interactive displays screen (162). The imager 102 adjusts the optical assembly 104 so that it autofocuses on objects at a distance that corresponds to the distance associated with the user-selected region of the displayed image (164). The imager 102 then captures another image such that objects at the distance corresponding to the distance associated with the user-selected region of the displayed image are in focus (166).

The foregoing techniques can, in some cases, be executed more rapidly relative to contrast AF techniques, and may require fewer computational resources.

In some implementations, the autofocus imaging device 100 is operable to collect distance data of a scene over a 0.1 m-1.5 m range (as measured from the device 100). In other implementations, the device 100 is operable to collect distance data over larger distances (e.g., up to 3 meters or more) by aggregating charges incident on several pixels.

The imaging device 100 can be operable in other passive and/or active modes when objects in a scene are outside of the specified ranges. For example, the TOF illumination source 112 can be operable to switch to a structured light mode, and distance data to objects in a scene can be calculated using the structured light. Further, in some modes of operation, the imaging device 100 can be configured to determine proper focus using a contrast AF technique.

Figure 4:
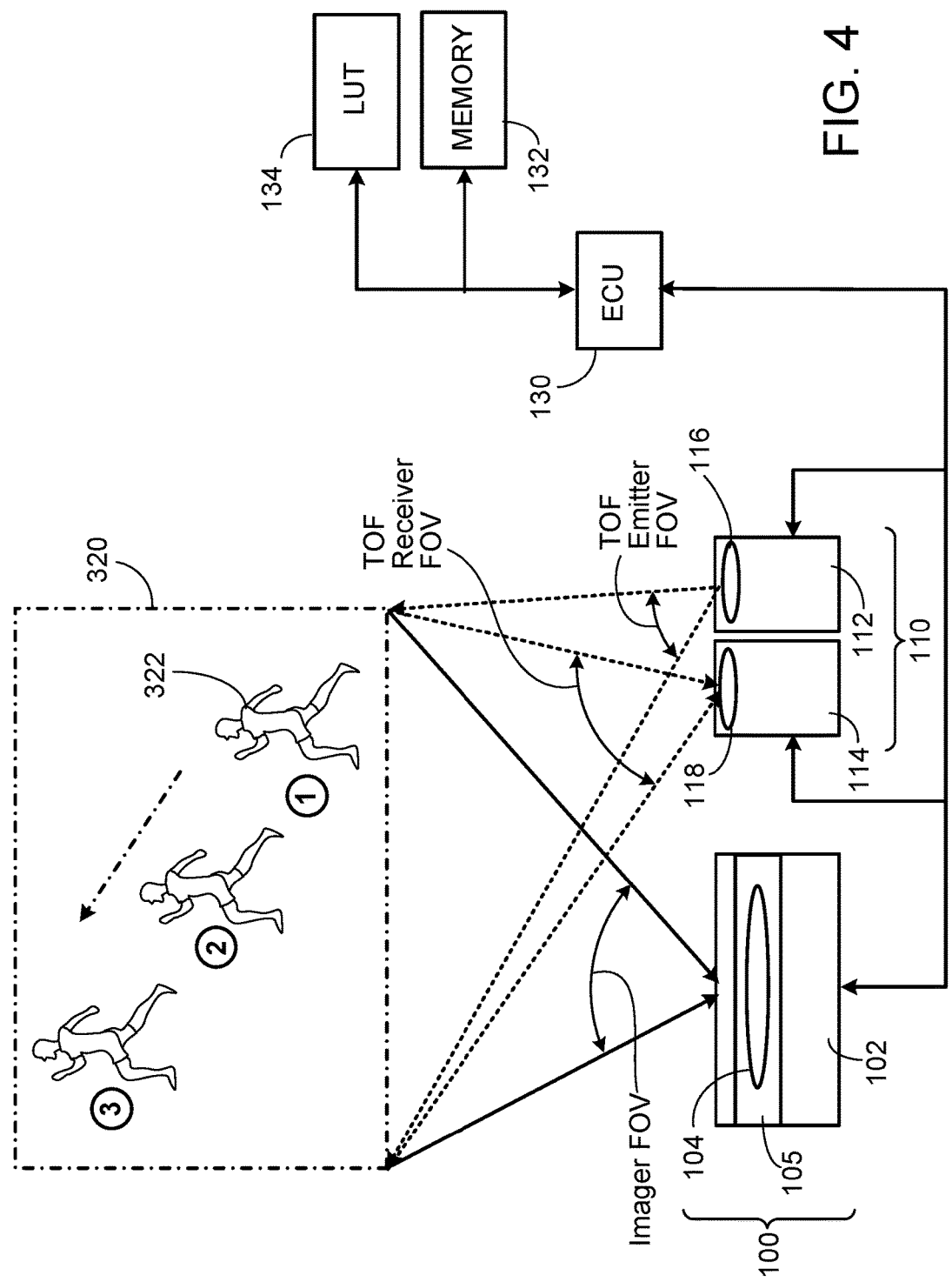
FIG. 4 illustrates another example of an imaging device.

The techniques described here can be used not only for still images, but also for video images. FIG. 4 illustrates an example of a scene 320 in which an object 322 is moving from a first position to a second position and then to a third position. In this example, it is assumed that an initial image is acquired at time t1, when the object 322 is at a first position. The acquired image is displayed on an interactive display screen 204 of a host device 200 (e.g., a smart phone). A user can select a particular object in the displayed image 302 (FIG. 5A) that she wants to be in-focus, for example, by touching the corresponding part of the interactive display screen 204 with her finger or with a stylus. For example, to select the object 322, the user would touch region I on the display screen 204. The ECU 130 then can use frame-to-frame tracking, for example, to track the position of the selected object 322A in the imager's field of view. At a subsequent time t2, when the object 322 is at a second position in the scene 320, another image is captured. Using frame-to-frame tracking, the ECU 130 can determine that the tracked object 322A now appears in region E of the displayed image 302A (see FIG. 5B).

Each time an image is captured, the TOF module 100 generates distance data for multiple points in the image. Thus, each region (A through I) of the displayed image is associated with corresponding distance data, which indicates the distance from the imaging device 100 to the objects in the scene 320. The ECU 130 can use the time between distance measurements, and the distances to the object 322 measured at the first and second positions, to calculate the real or relative speed and/or velocity of the object. This information can be used by the ECU 130 to predict a trajectory and future position of the tracked object 322 and to adjust the focus of the imager's optical assembly 104 such that when the tracked object reaches the third position at time t3, the imager's optical assembly will be in focus for the tracked object.

Figure 5C:
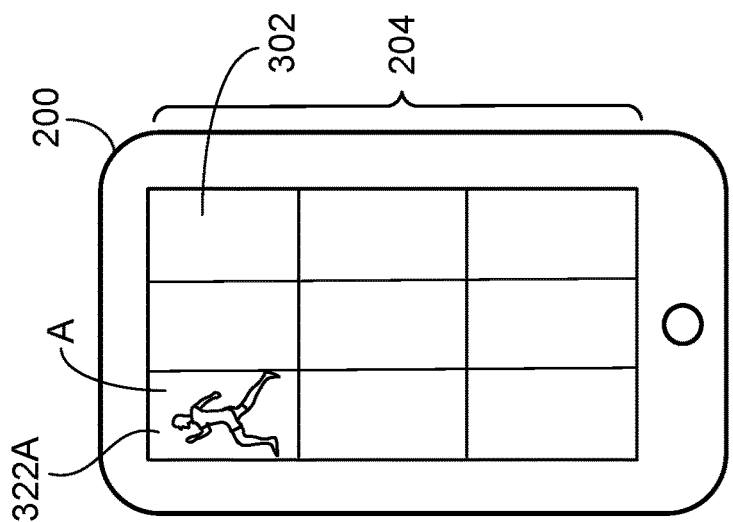
FIGS. 5A, 5B and 5C illustrate an example of a host device displaying a sequence of images acquired by the imaging device.
Figure 5B:
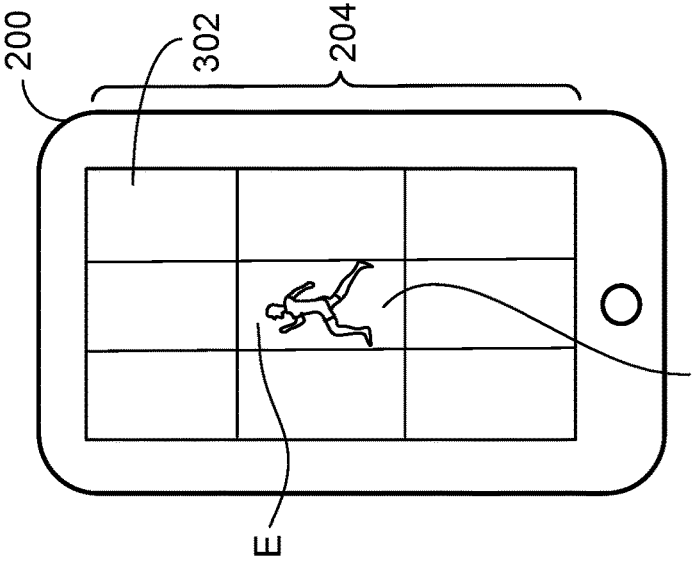
Figure 5A:
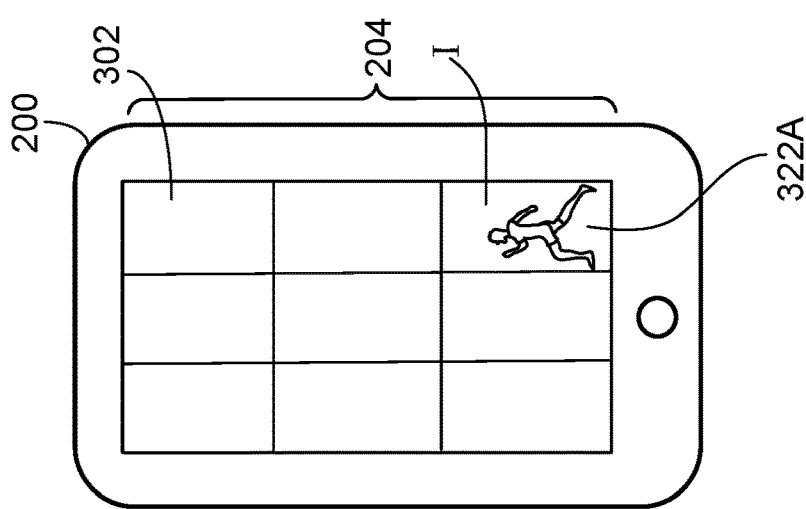

The foregoing techniques can, in some cases, be executed more rapidly relative to contrast AF techniques, and may require fewer computational resources. Further, because the present techniques can be executed more quickly, they can help reduce the amount of blur in the displayed image(s) (see FIG. 5C, showing the displayed image at time t3).

Various aspects of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus" and "computer" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. A computer can be embedded in another device, e.g., a mobile telephone or a personal digital assistant (PDA), to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Accordingly, various modifications can be made to the foregoing examples, and other implementations are within the scope of the claims.

What is claimed is:

1. A method of generating an image comprising:
   displaying a first image on a display screen, wherein each of multiple regions of the displayed image has associated therewith a respective distance value;
   receiving input indicative of a user-selection of one of the multiple regions of the displayed image; and
   in response to receiving the user input:
      adjusting a position of an optical assembly of an imager so that the imager is focused on one or more objects at a distance that corresponds to the respective distance value associated with the user-selected region of the displayed image;
      acquiring, by the imager, without further user input, a second image while the one or more objects at a distance that corresponds to a distance associated with the user-selected region of the displayed image are in focus for the imager.

2. The method of claim 1 further including calculating the respective distance value for each of the regions of the displayed first image based on an optical time-of-flight technique.

3. The method of claim 2 further including:
   emitting modulated or pulsed optical radiation signals toward the scene;
   sensing, by a time-of-flight receiver, signals of the modulated or pulsed optical radiation reflected by one or more objects in the scene;
   generating output signals based on the sensed signals; and
   calculating the respective distance value for each of the regions of the first image based, at least in part, on the output signals.

4. The method of claim 1, wherein receiving input indicative of a user-selection includes receiving a signal indicative of a user touching an area of the display screen where the selected region of the image appears.

5. The method of claim 1 wherein adjusting the position of the optical assembly is based, at least in part, on an adjustment amount stored in a look-up table in memory, wherein the adjustment amount corresponds to the distance associated with the user-selected region of the displayed image.

6. An apparatus comprising:
   a host device comprising a display screen and operable to receive user input; and
   an imaging device comprising:
      an imager operable to acquire an image of a scene, the imager including an adjustable optical assembly operable for autofocus;
      a time-of-flight module including: an illumination source to emit modulated or pulsed optical radiation, and a receiver operable to sense at least part of the modulated or pulsed optical radiation reflected by one or more objects in the scene at a wavelength emitted by the illumination source and, in response to sensing the at least part of the modulated or pulsed optical radiation, to generate output signals;
   one or more processors collectively operable to:
      cause a first image acquired by the imager to be displayed on the display screen,
      calculate a respective distance value for each of multiple regions of the displayed image based, at least in part, on the output signals; and
      in response to input indicative of a user-selection of one of the multiple regions of the displayed image, adjust a position of the optical assembly so that one or more objects, at a distance that corresponds to the respective distance value associated with the user-selected region of the displayed image, are in focus for the imager,
      wherein the imager is operable to acquire, without further user input, a second image while the one or more objects at a distance that corresponds to a distance associated with the user-selected region of the displayed image are in focus for the imager.

7. The apparatus of claim 6 wherein the one or more processors are collectively operable to calculate the respective distance value for each of the multiple regions of the displayed image using a time-of-flight technique.

8. The apparatus of claim 6 wherein the display screen is an interactive touch screen operable to receive an indication of the region of the displayed image selected by the user for autofocus in response to the user touching the display screen.

9. A method of generating an image comprising:
   displaying a first image on a display screen, wherein each of multiple regions of the displayed image has associated therewith a respective distance value;
   receiving input indicative of a user-selection of one of the regions of the displayed image, the selected region of the image including an object;
   estimating a future position of the object based, at least in part, on a distance that corresponds to the respective distance value associated with the user-selected region of the displayed image; and
   adjusting an optical assembly of an imager in response to the estimating, so that the object is in focus when the object is at the future position.

10. The method of claim 9 further including:
    acquiring, by the imager, a second image when the object is at the future position.

11. The method of claim 9 including calculating the respective distance value for each of the regions of the displayed first image based on an optical time-of-flight technique.

12. The method of claim 11 further including:
emitting modulated or pulsed optical radiation signals toward the scene;
sensing, by a time-of-flight receiver, signals of the modulated or pulsed optical radiation reflected by one or more objects in the scene;
generating output signals based on the sensed signals; and
calculating the respective distance value for each of the regions of the first image based, at least in part, on the output signals.

13. The method of claim 9, wherein receiving input indicative of a user-selection includes receiving a signal indicative of a user touching an area of the display screen where the object in the image appears.

14. An apparatus comprising:
a host device comprising a display screen and operable to receive user input; and
an imaging device comprising:
an imager operable to acquire an image of a scene, the imager including an adjustable optical assembly operable for autofocus;
a time-of-flight module including: an illumination source to emit modulated or pulsed optical radiation, and a receiver operable to sense at least part of the modulated or pulsed optical radiation reflected by one or more objects in the scene at a wavelength emitted by the illumination source and, in response to sensing the at least part of the modulated or pulsed radiation, to generate output signals based on the sensed signals;
one or more processors collectively operable to:
cause a first image acquired by the imager to be displayed on the display screen;
calculate a respective distance value for each of multiple regions of the displayed image based, at least in part, on the output signals;
in response to input indicative of a user-selection of one of the regions of the displayed image, where the selected region of the displayed image includes an object, estimate a future position of the object based, at least in part, on a distance that corresponds to the distance value associated with the user-selected region of the displayed image; and
cause adjustment of the optical assembly so that the object is in focus for the imager when the object is at the future position.

15. The apparatus of claim 14 wherein the one or more processors are collectively operable to calculate the respective distance value for each of the multiple regions of the displayed image using a time-of-flight technique.

16. The apparatus of claim 14 wherein the display screen is an interactive touch screen operable to receive an indication of the region of the displayed image selected by the user for autofocus in response to the user touching the display screen.

* * * * *